(12) United States Patent
Rao et al.

(10) Patent No.: US 10,429,108 B2
(45) Date of Patent: Oct. 1, 2019

(54) METHOD OF MAINTAINING THE FLOW RATE OF A REFRIGERANT WHILE MAINTAINING SUPERHEAT

(71) Applicant: DunAn Microstaq, Inc., Austin, TX (US)

(72) Inventors: Arvind P. Rao, Austin, TX (US); Dhaman Kumar Besarla, Leander, TX (US)

(73) Assignee: DunAn Microstaq, Inc., Austin, TX (US)

( * ) Notice: Subject to any disclaimer, the term of this patent is extended or adjusted under 35 U.S.C. 154(b) by 177 days.

(21) Appl. No.: 15/792,809

(22) Filed: Oct. 25, 2017

(65) Prior Publication Data

US 2018/0120006 A1    May 3, 2018

Related U.S. Application Data

(60) Provisional application No. 62/417,261, filed on Nov. 3, 2016.

(51) Int. Cl.
*F25B 41/06*    (2006.01)
*F25B 39/02*    (2006.01)
(Continued)

(52) U.S. Cl.
CPC .......... *F25B 41/065* (2013.01); *F25B 39/028* (2013.01); *F25B 39/04* (2013.01); *F25B 49/02* (2013.01); *F25B 49/022* (2013.01); *G01K 13/02* (2013.01); *G01K 15/005* (2013.01); *G05D 23/1931* (2013.01); *G05D 23/20* (2013.01);
(Continued)

(58) Field of Classification Search
CPC .... G05D 23/1931; G05D 23/30; F25B 41/06; F25B 39/028; F25B 2600/2515; F25B 2700/197; F25B 2700/21151; F25B 2700/2117; F25B 2700/21175
See application file for complete search history.

(56) References Cited

U.S. PATENT DOCUMENTS 9,140,613 B2    9/2015    Arunasalam et al.
9,404,815 B2    8/2016    Arunasalam et al.
(Continued)

*Primary Examiner* — Elizabeth J Martin
*Assistant Examiner* — Daniel C Comings
(74) *Attorney, Agent, or Firm* — MacMillan, Sobanski & Todd, LLC

(57) ABSTRACT

A method of maintaining a fluid flow rate in a heating, ventilating, air conditioning, and refrigeration (HVAC-R) system while maintaining superheat in the HVAC-R system at a desired level includes: continuously measuring an operating fluid temperature of the HVAC-R system and calculating superheat at a pre-determined rate, determining if the calculated superheat is stable, measuring and recording an operating fluid pressure of the system each time the calculated superheat is stable, recording an average operating fluid pressure each subsequent time the superheat is stable, calculating an output PWM and reducing fluid flow through a metering valve when an actual PWM is greater than the calculated output PWM by adjusting a PWM signal to a microvalve in the metering valve, and increasing fluid flow through the metering valve when the actual PWM is less than the calculated output PWM by adjusting the PWM signal to the microvalve.

16 Claims, 6 Drawing Sheets

(51) Int. Cl.
    *G01K 15/00*     (2006.01)
    *G01K 13/02*     (2006.01)
    *F25B 49/02*     (2006.01)
    *G05D 23/19*     (2006.01)
    *G05D 23/20*     (2006.01)
    *F25B 39/04*     (2006.01)

(52) U.S. Cl.
    CPC ......... *F25B 41/062* (2013.01); *F25B 2500/19* (2013.01); *F25B 2600/21* (2013.01); *F25B 2600/2513* (2013.01); *F25B 2600/2515* (2013.01); *F25B 2700/04* (2013.01); *F25B 2700/135* (2013.01); *F25B 2700/1933* (2013.01); *F25B 2700/21151* (2013.01); *F25B 2700/21175* (2013.01)

(56) References Cited

U.S. PATENT DOCUMENTS

| | | |
|---|---|---|
| 9,772,235 B2 | 9/2017 | Arunasalam et al. |
| 2013/0098086 A1* | 4/2013 | Sillato ................ F25B 49/02 62/184 |

\* cited by examiner

METHOD OF MAINTAINING THE FLOW
RATE OF A REFRIGERANT WHILE
MAINTAINING SUPERHEAT

BACKGROUND OF THE INVENTION

This invention relates in general to superheat controllers. In particular, this invention relates to an improved method of maintaining the flow rate of a refrigerant, such as in a conventional heating, ventilating, air conditioning, and refrigeration (HVAC-R) system, while maintaining superheat in the HVAC-R system at a desired level.

Conventional superheat control in a typical HVAC-R system uses a pressure sensor and a temperature sensor to measure HVAC-R system fluid pressure and temperature, respectively. Superheat is then calculated for a particular refrigerant using the measured temperature and pressure, and controlled by causing the superheat to move to a target superheat value by adjusting the pressure and temperature using any of a group of known open-loop or closed-loop algorithms, such as a classic proportional-integral-derivative (PID) loop.

Superheat is a function of pressure and temperature, and is conventionally calculated using pressure-temperature (P-T) charts that map a saturation temperature at a particular pressure. The values of the saturation temperatures at particular pressures may vary with different refrigerants. These values for saturation temperature and a temperature of the refrigerant are typically measured at an outlet of an evaporator in the conventional HVAC-R system, and are typically used to calculate superheat.

In conventional superheat control, system fluid pressure has been shown to oscillate, causing an undesirable uneven fluid flow rate through an electronic expansion valve (EEV) in the typical HVAC-R system, undesirably lengthening the on-time of the typical HVAC-R system. The conventional calculation of superheat can be slow to reflect an actual superheat due to the thermal properties of the system, particularly, the relatively long time required for the temperature sensor to stabilize Pressure however, responds almost instantaneously.

Thus, it would be desirable to provide an improved method of maintaining the flow rate of a refrigerant, such as in a conventional HVAC-R system, while maintaining superheat in the HVAC-R system at a desired level.

SUMMARY OF THE INVENTION

This invention relates to an improved method of maintaining the flow rate of a refrigerant, such as in a conventional HVAC-R system, while maintaining superheat in the HVAC-R system at a desired level by: continuously measuring an operating fluid temperature of the HVAC-R system, continuously calculating HVAC-R system superheat at a pre-determined rate, determining if the calculated HVAC-R system superheat is stable, measuring and recording the operating fluid pressure of the HVAC-R system each time the calculated HVAC-R system superheat is stable, recording an average operating fluid pressure each subsequent time the superheat is stable, calculating an output PWM according to the equation: Output PWM=(Flow Rate Component)+(Superheat Component), and reducing fluid flow through a metering valve in the HVAC-R system when an actual HVAC-R system PWM is greater than the calculated output HVAC-R system PWM by adjusting a PWM signal to a microvalve in the metering valve, and increasing fluid flow through the metering valve in the HVAC-R system when the actual HVAC-R system PWM is less than the calculated output HVAC-R system PWM by adjusting the PWM signal to the microvalve in the metering valve.

Various aspects of this invention will become apparent to those skilled in the art from the following detailed description of the preferred embodiment, when read in light of the accompanying drawings.

DETAILED DESCRIPTION OF THE PREFERRED EMBODIMENT

This invention includes an improved method of maintaining the flow rate of a refrigerant, such as in a conventional HVAC-R system, while maintaining superheat in the HVAC-R system at a desired level. As is known, superheat is a function of pressure and temperature. The improved method of the invention however, provides pressure-biased superheat control to an HVAC-R system that eliminates the undesirable uneven fluid flow associated with conventional superheat control methods. The improved method of the invention thus allows fluid flow through the HVAC-R system to be maintained at a desired, optimal flow rate.

Figure 1:
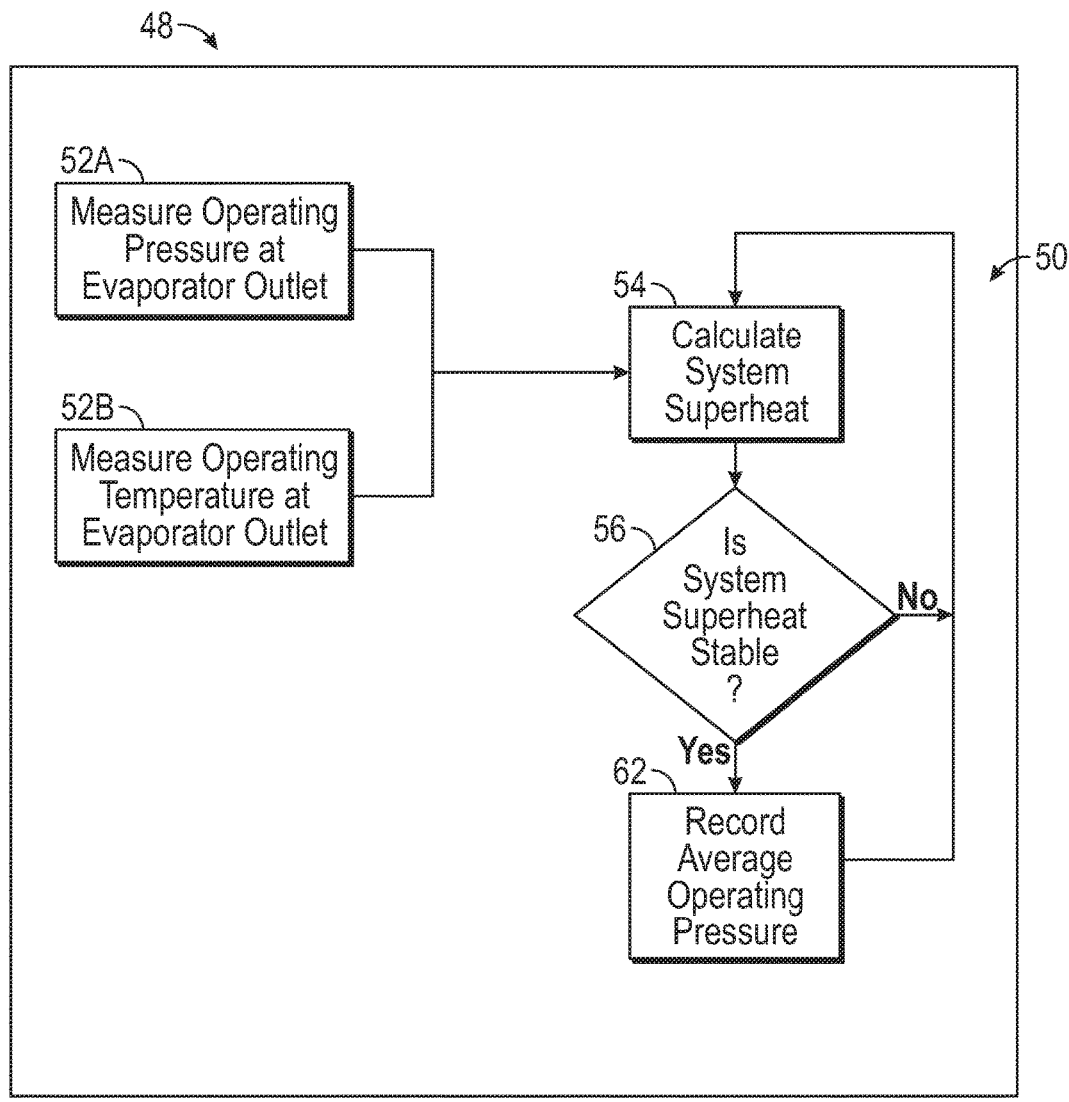
FIG. 1 is a flow chart showing a first step of the improved method according to this invention.
Figure 2:
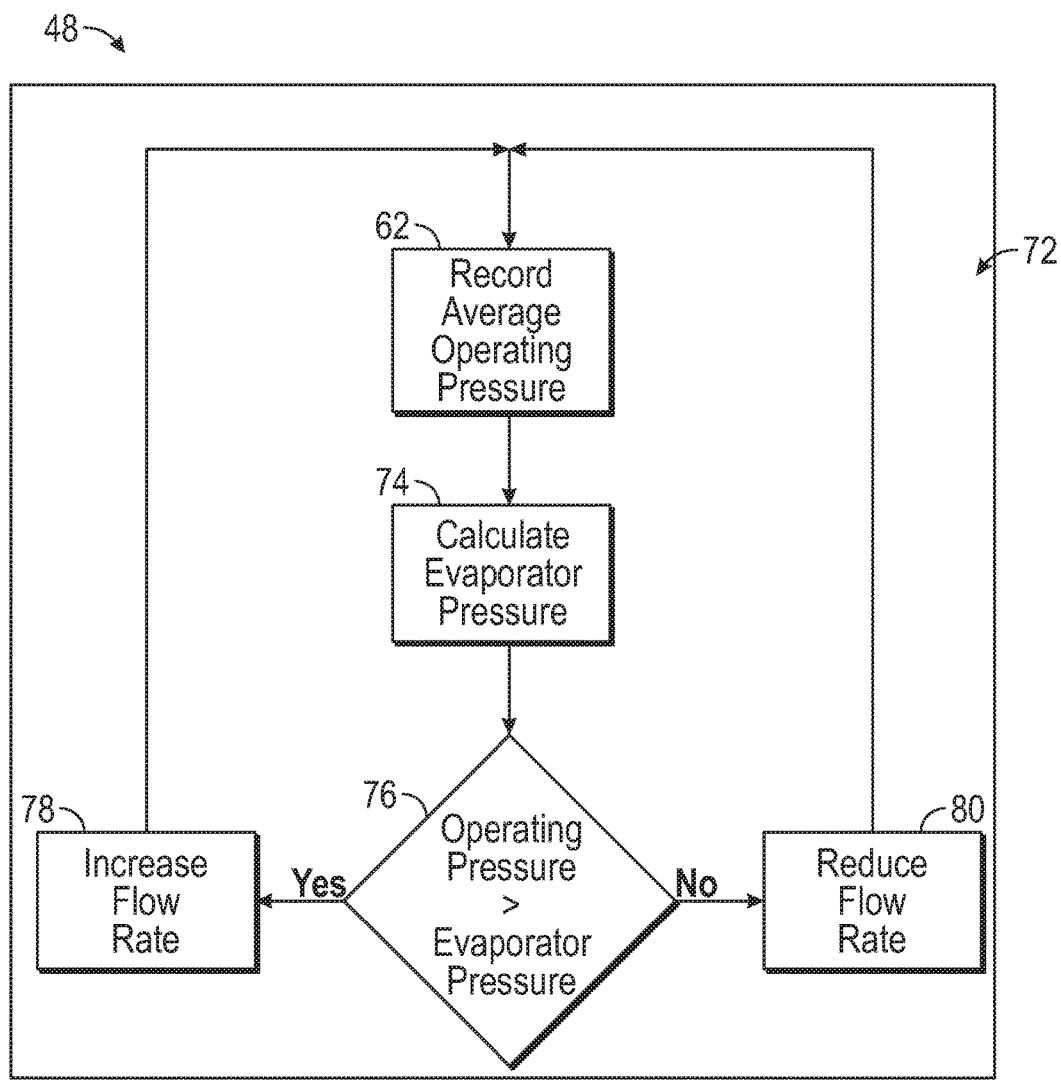
FIG. 2 is a flow chart showing a second step of the improved method according to this invention.
Figure 3:
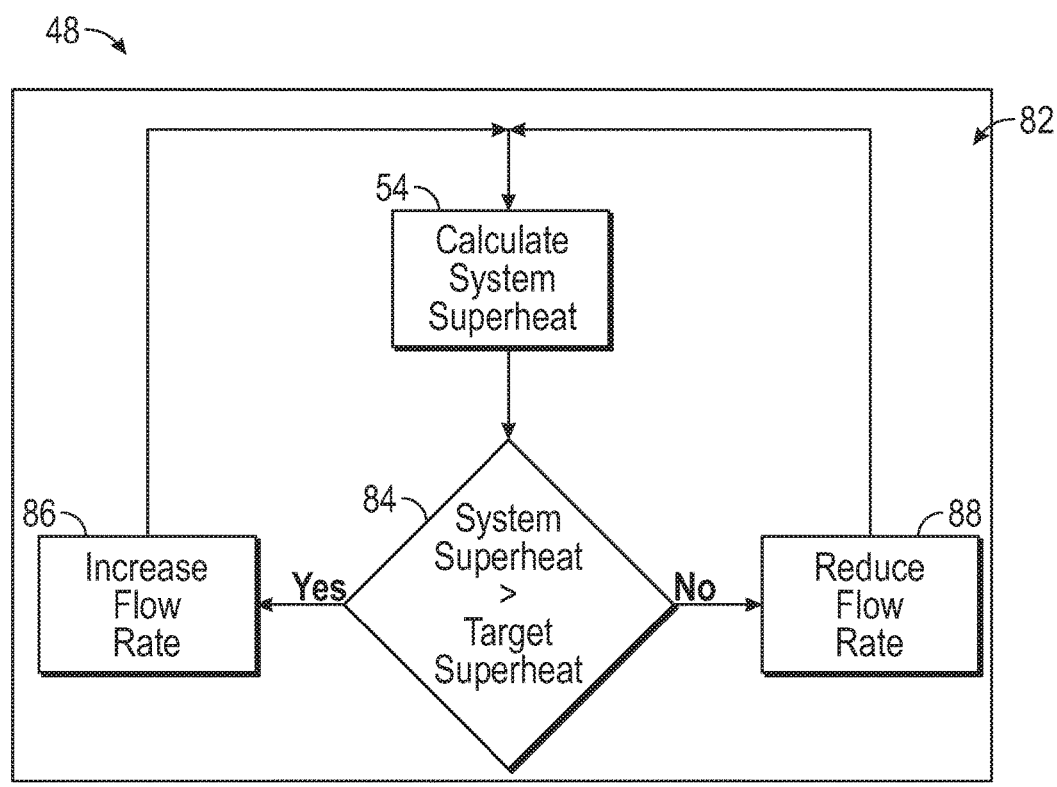
FIG. 3 is a flow chart showing a third step of the improved method according to this invention.

Referring now to the drawings, there is illustrated in FIGS. 1 through 3 a series of flow charts showing an improved method of controlling superheat 48 according to this invention. The improved method of controlling superheat 48 will be described below in detail.

Figure 4:
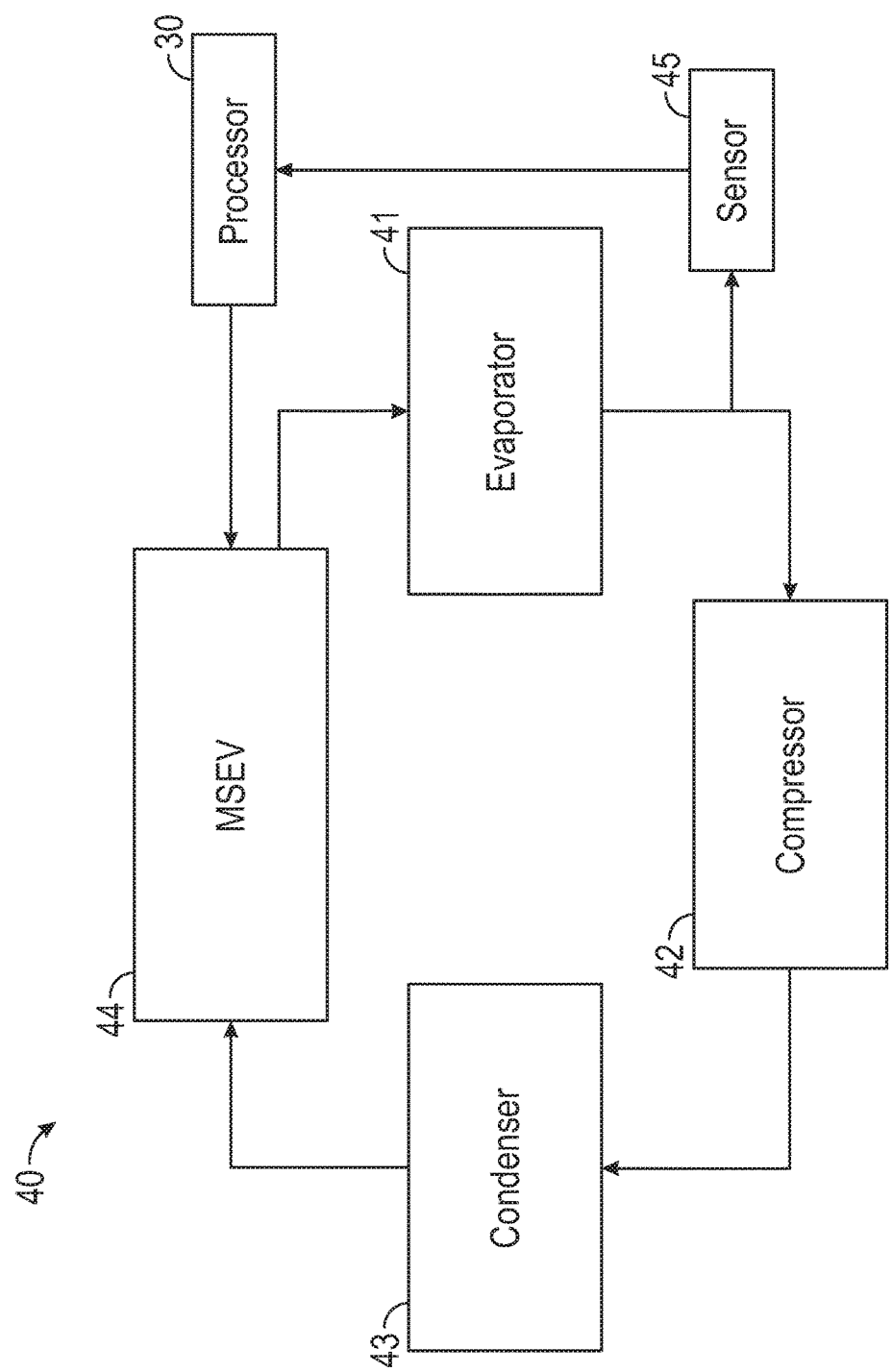
FIG. 4 is a block diagram of a representative embodiment of an HVAC-R system to which the method according to the invention may be applied.

Referring to FIG. 4, a block diagram of a representative embodiment of a HVAC-R system having a processer 30 in accordance with this invention is indicated generally at 40. Other than the improved processer 30, the illustrated HVAC-R system 40 is, in large measure, conventional in the art and is intended merely to illustrate one environment in which this invention may be used. Thus, the scope of this invention is not intended to be limited for use with the specific structure for the HVAC-R system 40 illustrated in FIG. 4 or with refrigeration systems in general. On the contrary, as will become apparent below, this invention may be used in any desired environment for the purposes described below.

As is well known in the art, the HVAC-R system 40 circulates a refrigerant through a closed circuit, where it is sequentially subjected to compression, condensation, expansion, and evaporation. The circulating refrigerant removes heat from one area (thereby cooling that area) and expels the heat in another area.

To accomplish this, the illustrated HVAC-R system 40 includes an evaporator 41, such as an evaporator coil. The evaporator 41 is conventional in the art and is adapted to receive a relatively low pressure liquid refrigerant at an inlet thereof. A relatively warm fluid, such as air, can be caused to flow over the evaporator 41, causing the relatively low pressure liquid refrigerant flowing in the evaporator 41 to expand, absorb heat from the fluid flowing over the evaporator 41, and evaporate within the evaporator 41. The relatively low pressure liquid refrigerant entering into the inlet of the evaporator 41 is thus changed to a relatively low pressure refrigerant gas exiting from an outlet of the evaporator 41.

The outlet of the evaporator 41 communicates with an inlet of a compressor 42. The compressor 42 is conventional in the art and is adapted to compress the relatively low pressure refrigerant gas exiting from the evaporator 41 and to move such relatively low pressure refrigerant gas through the HVAC-R system 40 at a relatively high pressure. The relatively high pressure refrigerant gas is discharged from an outlet of the compressor 42 that communicates with an inlet of a condenser 43. The condenser 43 is conventional in the art and is configured to remove heat from the relatively high pressure refrigerant gas as it passes therethrough. As a result, the relatively high pressure refrigerant gas condenses and becomes a relatively high pressure refrigerant liquid.

The relatively high pressure refrigerant liquid then moves from an outlet of the condenser 43 to an inlet of an expansion device 44. In the illustrated embodiment, the expansion device 44 is a Modular Silicon Expansion Valve (MSEV), described below, that is configured to restrict the flow of fluid therethrough. As a result, the relatively high pressure refrigerant liquid is changed to a relatively low pressure refrigerant liquid as it leaves the expansion device. The relatively low pressure refrigerant liquid is then returned to the inlet of the evaporator 41, and the refrigeration cycle is repeated.

The illustrated HVAC-R system 40 additionally includes an external sensor 45 that communicates with the fluid line that provides fluid communication from the evaporator 41 to the compressor 42. The external sensor 45 is responsive to one or more properties of the fluid (such as, for example, pressure, temperature, and the like) in the fluid line for generating a signal that is representative of that or those properties to a controller or processor, such as the processor 30. In response to the signal from the external sensor 45 (and, if desired, other non-illustrated sensors or other inputs), the processor 30 generates a signal to control the operation of the expansion device 44. If desired, the external sensor 45 and the processor 30 may be embodied together as the SHC 10 described in detail below.

MSEVs, such as the MSEV 44 are electronically controlled, normally closed, and single flow directional valves. MSEVs 44 may be used for refrigerant mass flow control in conventional HVAC and HVAC-R applications.

The MSEV 44 is a two-stage proportional control valve. The first stage is a microvalve (not shown) configured as a pilot valve to control a second stage spool valve (not shown). When the microvalve (not shown) receives a Pulse Width Modulation (PWM) signal from the processor 30, the microvalve (not shown) modulates to change the pressure differential across the second stage spool valve (not shown). The spool valve (not shown) will move to balance the pressure differential, effectively changing an orifice opening of the MSEV 44 to control a desired amount of refrigerant flow.

U.S. Pat. No. 9,140,613 discloses a superheat controller (SHC). The SHC disclosed therein is a single, self-contained, stand-alone device which contains all the sensors, electronics, and intelligence to automatically detect a fluid type, such as refrigerant, and report the superheat of multiple common fluid types used in residential, industrial, and scientific applications. U.S. Pat. No. 9,140,613 is incorporated herein in its entirety.

Figure 5:
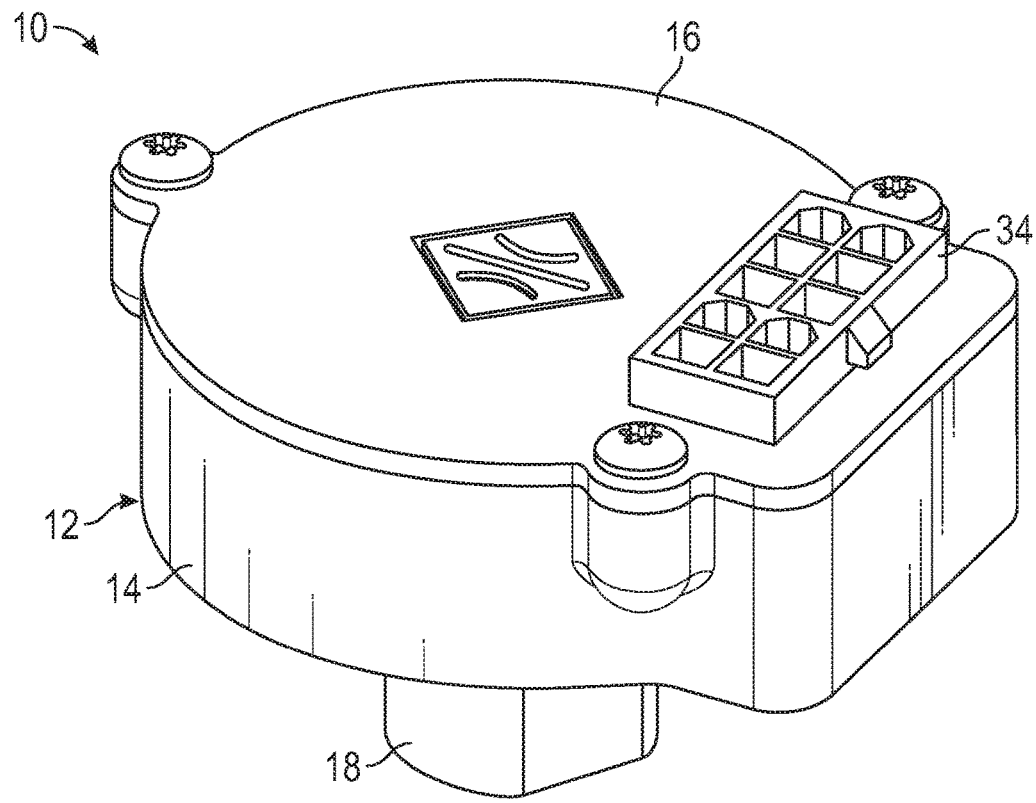
FIG. 5 is a perspective view of an embodiment of a universal superheat controller to which the method according to the invention may be applied.
Figure 6:
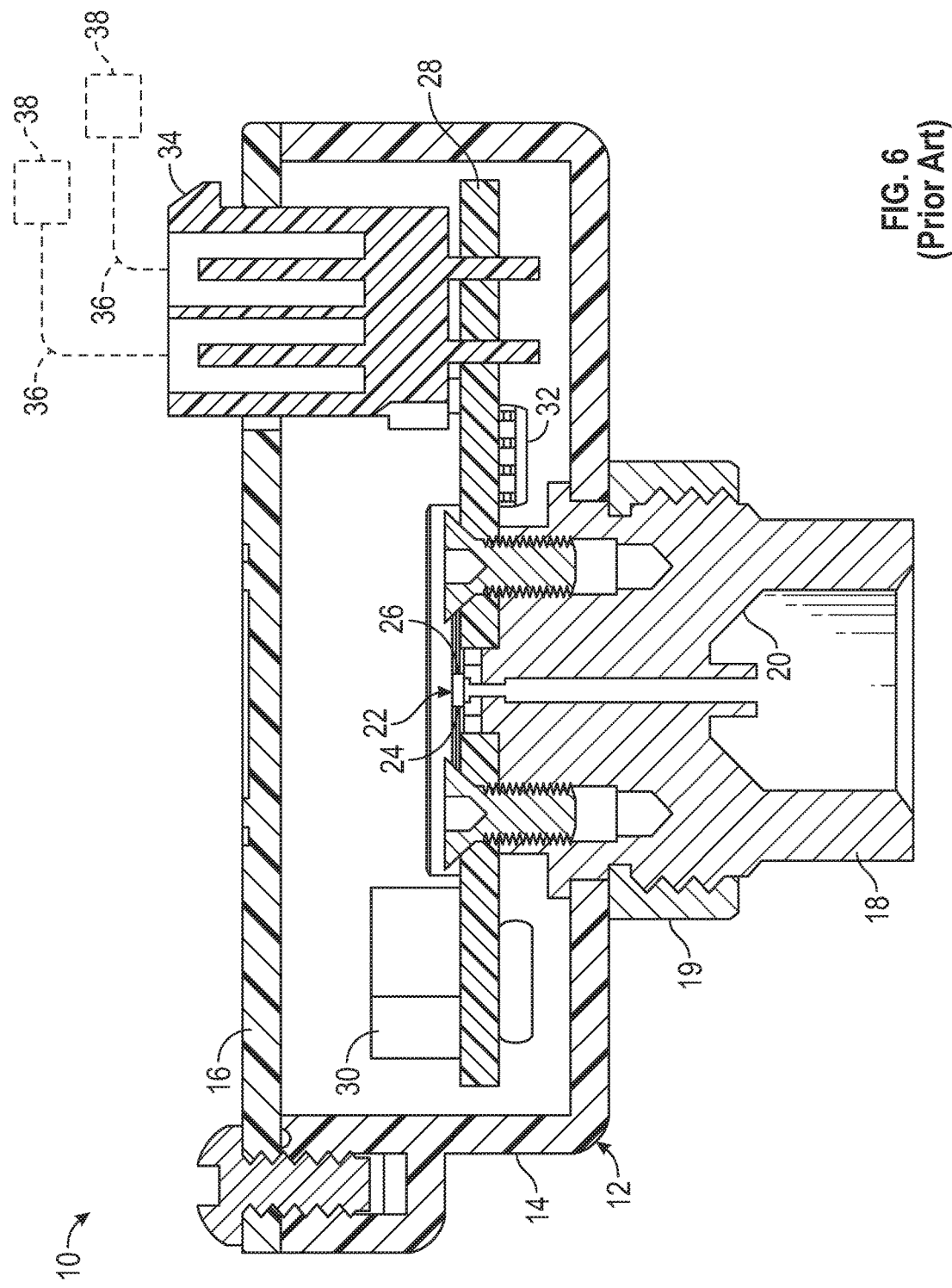
FIG. 6 is a cross sectional view of the universal superheat controller illustrated in FIG. 5.

FIGS. 5 and 6 herein illustrate an SHC 10, which is similar to the superheat controller disclosed in U.S. Pat. No. 9,140,613. The SHC 10, like the HVAC-R system 40 described above, is in large measure, conventional in the art and is intended merely to illustrate one device in which this invention may be used. Thus, the scope of this invention is not intended to be limited for use with the specific structure for the SHC 10 illustrated in FIGS. 5 and 6 or with devices configured to detect and report superheat in a fluid system in general. On the contrary, as will become apparent below, this invention may be used in any desired device for the purposes described below.

As shown in FIGS. 5 and 6, the illustrated embodiment of the SHC 10 includes a housing 12 having a body 14, a cover 16, and a fluid inlet member 18. The fluid inlet member 18 may be secured to the housing 12 by a mounting ring 19. The mounting ring 19 attaches the fluid inlet member 18 to the housing 12 portion by a threaded connection. Alternatively, the mounting ring 19 may be attached to the fluid inlet member 18 by any desired method, such as by welding or press fitting. In the embodiment illustrated in FIGS. 5 and 6, the fluid inlet member 18 is a brass fitting having a centrally formed opening that defines a sealing surface 20.

The SHC 10 includes an integrated pressure and temperature sensor 22 having pressure sensor portion 24 and a temperature sensor portion 26 mounted to a printed circuit board (PCB) 28. The superheat processor 30, a data-reporting or communication module 32, and an Input/Output (IO) module 34 are also mounted to the PCB 28. The IO module 34 is a physical hardware interface that accepts input power and reports data through available hard-wired interfaces, such as wires or cables 36, to the superheat processor 30. Target devices 38 that may be connected to the SHC 10 via the IO module 34 may include additional temperature sensors, laptop and notebook computers, cell phones, memory cards, and any device used in or with conventional end of the line test equipment. Alternatively, the target devices 38 may be connected to the communication module 32 by a wireless connection.

The superheat processor 30 is mounted to the PCB 28 and is a high-resolution, high-accuracy device that processes the input signals from the pressure and temperature sensor portions 24 and 26, respectively, of the integrated pressure and temperature sensor 22, detects the fluid type, calculates the superheat of the fluid, and provides an output that identifies the level of the calculated superheat. The superheat processor 30 may also be configured to provide other data, such as fluid temperature, fluid pressure, fluid type, relevant historical dates maintained in an onboard memory (such as alarm and on-off history), and other desired information. Advantageously, the superheat processor 30 maintains a high level of accuracy over a typical operating range of pressure and temperature after a one-time calibration. Non-limiting examples of suitable superheat processors include microcontrollers, Field Programmable Gate Arrays (FPGAs), and Application Specific Integrated Circuits (ASICs) with embedded and/or off-board memory and peripherals.

A first step of the method of controlling superheat 48 is shown at 50 in FIG. 1. As shown in FIG. 1, the first step 50 of the method 48 includes continuously measuring an operating fluid pressure 52A and an operating fluid temperature 52B of the HVAC-R system 40 (see FIG. 4). The operating fluid pressure 52A and the operating fluid temperature 52B may be continuously measured by the sensor 45 at the outlet of the evaporator 41 while the HVAC-R system 40 is operating. The operating fluid pressure 52A and the operating fluid temperature 52B may then be used to calculate the superheat 54 of the HVAC-R system 40. The calculation of superheat 54 may occur very frequently, such as at a rate within about one calculation/100 ms to about one calculation/second.

As shown at 56, a determination of whether the system superheat is stable is made (the definition of stable superheat is provided below), and a target or initial average operating pressure is recorded at 62.

A second step of the method of controlling superheat 48 is shown at 72 in FIG. 2 and begins with the recorded average operating fluid pressure 62. A fluid pressure within the evaporator 41 may be calculated at frequent intervals, such as about every 100 ms, as shown at 74.

The average operating fluid pressure 62 is then compared to the evaporator fluid pressure, as shown in block 76. If the average operating fluid pressure 62 is greater than the fluid pressure within the evaporator 41, then fluid flow through a metering valve or expansion device, such as the MSEV 44, may be increased as shown at 78. If the average operating fluid pressure 62 is less than the fluid pressure within the evaporator 41, then fluid flow through the MSEV 44 may be reduced as shown at 80.

A third step of the method of controlling superheat 48 is shown at 82 in FIG. 3 and begins with the calculated system superheat 54 of the HVAC-R system 40. As described above, the superheat 54 may be calculated at frequent intervals, such as about every 100 ms.

The calculated system superheat 54 is then compared to a target superheat, as shown in block 84. Target superheat may be defined as the desired superheat at which the system needs to run. The calculated system superheat 54 may be greater than or less than the target superheat. If the calculated system superheat 54 is greater than the target superheat by a pre-determined amount, discussed below, then fluid flow through the MSEV 44 may be increased as shown at 86. If the calculated system superheat 54 is less than the target superheat by a pre-determined amount, discussed below, then fluid flow through the MSEV 44 may be reduced as shown at 88.

A goal of the third step 82 is to achieve stable superheat. As used herein, the phrase stable superheat may be defined as superheat that has a temperature within about ±2° F. of the target superheat for more than about 80% of the operation time of the HVAC-R system 40. Thus, the predetermined amount that the calculated system superheat 54 is greater than and less than the target superheat may be about ±2° F. of the target superheat.

Significantly, the method 48 of the invention uses HVAC-R system fluid pressure as a leading indicator of a fluid flow rate through the HVAC-R system 40. Using the measured fluid pressure allows for a faster response than a conventional superheat calculation that is based on both pressure and temperature, because there tends to be a thermal lag in the HVAC-R system 40 that undesirably delays a conventional superheat calculation that is based on both pressure and temperature.

HVAC-R system fluid pressure, as shown at 62 in FIG. 1 and at 68 in FIG. 2, may be used as the leading indicator of the fluid flow rate through the HVAC-R system 40, and thus for superheat control of the HVAC-R system 40. To determine whether the HVAC-R system 40 is operating at a desired stable superheat value, an output HVAC-R system PWM may calculated according to the equation:

Output PWM=(Flow Rate Component)+(Superheat Component)

wherein: the Flow Rate Component may be defined as the result of regulating around the target operating pressure 62, i.e., by performing the process steps as shown in FIG. 2, and the Superheat Component may be defined as the result of regulating around the target superheat, i.e., by performing the process steps as shown in FIG. 3.

The output PWM calculation described herein may occur very frequently, such as about every 100 ms. The processor 30 may include an algorithm that provides the instruction for the calculations of the output PWM. This algorithm may respond very quickly to pressure changes in the HVAC-R system 40 as the HVAC-R system 40 is more sensitive to pressure changes at the outlet of the evaporator 41. The method 48 of the invention thus provides a more accurate assessment of system performance of the HVAC-R system 40 relative to calculated superheat because, in addition to pressure, conventional calculated superheat additionally requires measured temperature, which tends to lag in the HVAC-R system 40.

If the actual HVAC-R system PWM is greater than the calculated output HVAC-R system PWM, then fluid flow through a metering valve, such as the MSEV 44, may be reduced, such as by adjusting a PWM signal to decrease the actual HVAC-R system PWM in a known manner. If the actual HVAC-R system PWM is less than the calculated output HVAC-R system PWM, then fluid flow through the MSEV 44 may be increased, such as by adjusting the PWM signal to increase the actual HVAC-R system PWM in a known manner.

Advantageously, the PWM calculation algorithm keeps the MSEV 44 moving in small increments continuously. This continuous movement of the MSEV 44 in small increments helps open the MSEV 44 quickly if the MSEV 44, even if the MSEV 44 is in the process of closing. This is particularly advantageous in oversized valves, such as valves that have more flow capability than needed for the fluid system within which it is being used.

As described above, there tends to be a thermal lag in the HVAC-R system 40 that undesirably delays a conventional superheat calculation that is based on both pressure and temperature. Advantageously, the method 50 of the invention uses HVAC-R system fluid pressure as a leading indicator of a fluid flow rate through the HVAC-R system 40, thus allowing for a faster response than a conventional superheat calculation that is based on both pressure and temperature. The conventional calculation of superheat can be slow to reflect an actual superheat due to the thermal properties of the system, particularly, the relatively long time required for the temperature sensor to stabilize Pressure however, responds almost instantaneously. As described above, HVAC-R system pressure may be measured at an exit of the evaporator 41, and the pressure sensor 45 can detect pressure changes almost instantaneously, such as within about 100 ms. Additionally, pressure variation tend to be proportionally larger than temperature variation in the same HVAC-R system. The PWM calculation described herein may occur very frequently, such as about every 100 milliseconds. Temperature changes that may be sensed and measured at the exit of the evaporator 41 lag and are slow to be detected by the temperature sensor. The temperature measurements may thus be very inaccurate.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of maintaining a fluid flow rate in a heating, ventilating, air conditioning, and refrigeration (HVAC-R) system while maintaining superheat in the HVAC-R system at a desired level comprising:
    continuously measuring an operating fluid temperature of the HVAC-R system;
    continuously calculating HVAC-R system superheat at a pre-determined rate;
    determining if the calculated HVAC-R system superheat is stable;
    measuring and recording an operating fluid pressure of the HVAC-R system each time the calculated HVAC-R system superheat is stable;
    recording an average operating fluid pressure each subsequent time the superheat is stable;
    calculating an output PWM according to the equation:

Output PWM=(Flow Rate Component)+(Superheat Component); and reducing fluid flow through a metering valve in the HVAC-R system when an actual PWM of the HVAC-R system is greater than the calculated output PWM of the HVAC-R system by adjusting a PWM signal to a microvalve in the metering valve, and increasing fluid flow through the metering valve in the HVAC-R system when the actual PWM of the HVAC-R system is less than the calculated output PWM of the HVAC-R system by adjusting the PWM signal to the microvalve in the metering valve;
    wherein the Flow Rate Component is the result of regulating around a target operating fluid pressure by performing the steps of: (1) determining an average operating fluid pressure, (2) calculating a fluid pressure within an evaporator, and (3) comparing the average operating fluid pressure to the fluid pressure within the evaporator, such that if the average operating fluid pressure is greater than the fluid pressure within the evaporator, then fluid flow through an expansion device is increased, and if the average operating fluid pressure is less than the fluid pressure within the evaporator, then fluid flow through the expansion device reduced, and
    wherein the Superheat Component is the result of regulating around a target superheat by performing the steps of: (1) calculating the system superheat of the HVAC-R, (2) and comparing the calculated system superheat to a target superheat, such that if the calculated system superheat is greater than the target superheat by a pre-determined amount, then fluid flow through the expansion device is increased, and if the calculated system superheat is less than the target superheat by a pre-determined amount, then fluid flow through the expansion device is reduced as shown.

2. The method according to claim 1, wherein the step of calculating HVAC-R system superheat occurs at a rate within about one calculation/100 ms to about one calculation/second.

3. The method according to claim 1, wherein the step of calculating the fluid pressure within the evaporator of the HVAC-R system includes calculating the fluid pressure at intervals of about 100 ms.

4. The method according to claim 1, wherein the operating fluid pressure of the HVAC-R system is measured at an outlet of an evaporator of the HVAC-R system.

5. The method according to claim 1, wherein the target operating fluid pressure is determined based on the HVAC-R system and the conditions within which the HVAC-R system is operating.

6. The method according to claim 1, wherein the metering valve is a modular silicon expansion valve.

7. The method according to claim 1, wherein the step of measuring and recording an operating fluid pressure of the HVAC-R system each time the calculated HVAC-R system superheat is stable further includes continuously monitoring the operating fluid pressure of the HVAC-R system with a sensor at an outlet of an evaporator of the HVAC-R system.

8. The method according to claim 1, wherein the step of calculating the output PWM includes calculating the output PWM at intervals of about 100 ms.

9. The method according to claim 1, wherein the HVAC-R system includes a controller configured to calculate the output PWM.

10. A method of maintaining a fluid flow rate in a heating, ventilating, air conditioning, and refrigeration (HVAC-R) system while maintaining superheat in the HVAC-R system at a desired level comprising:
    continuously measuring an operating fluid pressure of the HVAC-R system;
    continuously measuring an operating fluid temperature of the HVAC-R system;
    continuously calculating HVAC-R system superheat at a pre-determined rate;
    determining if the calculated HVAC-R system superheat is stable;
    measuring and recording the operating fluid pressure of the HVAC-R system each time the calculated HVAC-R system superheat is stable;
    recording an initial operating fluid pressure and creating a record of the operating fluid pressure;
    updating the record of operating fluid pressure with an additional operating fluid pressure each subsequent time the superheat is stable;
    calculating a fluid pressure within an evaporator of the HVAC-R system at pre-determined intervals;
    increasing fluid flow through a metering valve in the HVAC-R system when an average of the recorded operating fluid pressure measurement is greater than the calculated evaporator fluid pressure, and reducing fluid flow through the metering valve in the HVAC-R system when the average operating fluid pressure is less than the calculated evaporator fluid pressure;
    comparing the calculated HVAC-R system superheat to a target HVAC-R superheat value;
    increasing fluid flow through the metering valve in the HVAC-R system when the calculated system superheat is greater than the target HVAC-R superheat, and reducing fluid flow through the metering valve in the HVAC-R system when the calculated system superheat is less than the target HVAC-R superheat; and
    calculating an output PWM according to the equation:

Output PWM=(Flow Rate Component)+(Superheat Component);

wherein the Flow Rate Component is the result of regulating around a target operating fluid pressure by performing the steps of: (1) determining an average operating fluid pressure, (2) calculating the fluid pressure within the evaporator, and (3) comparing the average operating fluid pressure to the fluid pressure within the evaporator, such that if the average operating fluid pressure is greater than the fluid pressure within the evaporator, then fluid flow through an expansion device is increased, and if the average operating fluid pressure is less than the fluid pressure within the evaporator, then fluid flow through the expansion device reduced, and wherein the Superheat Component is the result of regulating around the target HVAC-R superheat by performing the steps of: (1) calculating the HVAC-R system superheat, (2) and comparing the calculated HVAC-R system superheat to the target HVAC-R superheat, such that if the calculated HVAC-R system superheat is greater than the target HVAC-R superheat by a pre-determined amount, then fluid flow through the expansion device is increased, and if the calculated HVAC-R system superheat is less than the target HVAC-R superheat by a pre-determined amount, then fluid flow through the expansion device is reduced.

11. The method according to claim 10, wherein the operating fluid pressure and the operating fluid temperature of the HVAC-R system are measured at an outlet of the evaporator.

12. The method according to claim 10, wherein the steps of increasing fluid flow through the metering valve of the HVAC-R system and reducing fluid flow through the metering valve of the HVAC-R system further include adjusting a PWM signal to a microvalve in the metering valve.

13. The method according to claim 10, wherein the steps of continuously measuring an operating fluid pressure of the HVAC-R system and continuously measuring an operating fluid temperature of the HVAC-R system further includes using a sensor at an outlet of the evaporator to continuously measure the operating fluid pressure of the HVAC-R system and continuously measure the operating fluid temperature of the HVAC-R system.

14. The method according to claim 10, wherein the step of calculating the output PWM includes calculating the output PWM at intervals of about 100 ms.

15. The method according to claim 10, further including reducing fluid flow through the metering valve in the HVAC-R system when the actual HVAC-R system PWM is greater than the calculated output HVAC-R system by adjusting a PWM signal to a microvalve in the metering valve, and increasing fluid flow through the metering valve in the HVAC-R system when the actual HVAC-R system PWM is less than the calculated output HVAC-R system PWM by adjusting the PWM signal to the microvalve in the metering valve.

16. The method according to claim 10, wherein the flow rate component is a result of regulating around a target operating pressure, and the superheat component is a result of regulating around the target superheat.

* * * * *